(12) United States Patent
Matsch

(10) Patent No.: US 7,380,755 B2
(45) Date of Patent: Jun. 3, 2008

(54) FRANGIBLE PNEUMATIC LATCH

(75) Inventor: Gary L. Matsch, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 375 days.

(21) Appl. No.: 11/138,154

(22) Filed: May 26, 2005

(65) Prior Publication Data

US 2006/0266888 A1 Nov. 30, 2006

(51) Int. Cl.
*B64D 25/14* (2006.01)
(52) U.S. Cl. .................... 244/137.2; 244/905; 292/252
(58) Field of Classification Search ............ 244/137.1, 244/137.2, 905, 118.3; 292/137, 138, 144, 292/150, 252; 182/48; 280/728.3
See application file for complete search history.

(56) References Cited

U.S. PATENT DOCUMENTS

| | | | | |
|---|---|---|---|---|
| 2,338,707 | A | * | 1/1944 | Boynton ...................... 251/89 |
| 2,479,359 | A | * | 8/1949 | Holt ...................... 137/115.19 |
| 3,017,907 | A | * | 1/1962 | Quail et al. ................. 141/197 |
| 3,338,609 | A | * | 8/1967 | Banas .......................... 16/229 |
| 3,617,081 | A | * | 11/1971 | Drucker ..................... 292/252 |
| 3,702,623 | A | * | 11/1972 | Chacko ...................... 137/495 |
| 3,771,749 | A | * | 11/1973 | Smialowicz ............. 244/137.2 |
| 3,897,861 | A | * | 8/1975 | Miller et al. .............. 193/25 B |
| 3,910,532 | A | * | 10/1975 | Fischer .................... 244/137.2 |
| 3,973,744 | A | * | 8/1976 | Hintzman ................ 244/137.2 |
| 4,071,271 | A | * | 1/1978 | Bourrie et al. ............. 292/201 |
| 4,106,729 | A | * | 8/1978 | Bergman et al. ......... 244/137.2 |
| 4,125,235 | A | * | 11/1978 | Fitzgerald et al. ....... 244/129.5 |
| 4,127,966 | A | * | 12/1978 | Schmidt ..................... 49/141 |
| 4,375,877 | A | * | 3/1983 | Shorey .................... 244/137.2 |
| 4,475,017 | A | * | 10/1984 | Karrenbauer ................ 218/57 |
| 4,483,639 | A | * | 11/1984 | McCandless, II ........... 403/317 |
| 4,512,539 | A | * | 4/1985 | Ackermann et al. ..... 244/137.2 |
| 4,567,977 | A | * | 2/1986 | Fisher ...................... 193/25 B |
| 4,586,425 | A | * | 5/1986 | Redman et al. ................ 91/45 |
| 4,691,948 | A | * | 9/1987 | Austin et al. ............... 292/171 |
| 4,723,929 | A | * | 2/1988 | Parish ......................... 441/39 |
| 5,009,249 | A | * | 4/1991 | Fisher et al. ................ 137/495 |
| 5,102,070 | A | * | 4/1992 | Smialowicz et al. ..... 244/137.2 |
| 5,102,176 | A | * | 4/1992 | Duggal .................... 294/82.31 |
| 5,253,619 | A | * | 10/1993 | Richeson et al. ........ 123/90.12 |
| 5,354,160 | A | * | 10/1994 | Pratt et al. .................. 411/501 |
| 5,586,615 | A | * | 12/1996 | Hammer et al. .............. 182/48 |
| 6,240,951 | B1 | * | 6/2001 | Yori ........................... 137/224 |
| 6,336,667 | B1 | * | 1/2002 | Ford et al. .................... 292/25 |

(Continued)

*Primary Examiner*—Michael R. Mansen
*Assistant Examiner*—Joseph W Sanderson
(74) *Attorney, Agent, or Firm*—Jerry J. Holden; John D. Titus

(57) ABSTRACT

An inflatable evacuation slide system includes an inflatable evacuation slide stored in a packboard compartment the cover panel of which is retained by a plurality of frangible pneumatic latches. The frangible pneumatic latches each comprise a tension member one end of which is attached to the packboard housing and the other end of which is releasably attached to the cover panel. In normal operation, a pneumatic signal operating on an actuator piston withdraws the piston to allow the latch mechanism to release the cover panel. In the event of a failure of the release mechanism, since the releasable latch secures the cover panel to the frangible tension member rather than to the packboard directly, the force of the inflating evacuation slide breaks the frangible member allowing the cover panel to drop away with only a brief delay in slide deployment.

6 Claims, 4 Drawing Sheets

U.S. PATENT DOCUMENTS

| | | |
|---|---|---|
| 6,431,197 B2 * | 8/2002 | Hintzman et al. ............ 137/71 |
| 6,513,841 B1 * | 2/2003 | Jackson ...................... 292/214 |
| 6,659,404 B1 * | 12/2003 | Roemke .................. 244/137.2 |
| 6,761,337 B2 * | 7/2004 | Baderspach et al. ..... 244/137.2 |
| 6,840,703 B2 * | 1/2005 | Blanchard ................ 403/322.2 |
| 7,021,166 B2 * | 4/2006 | Gressel ............................ 74/2 |
| 2003/0085554 A1 * | 5/2003 | Thomas ................... 280/728.3 |

* cited by examiner

FRANGIBLE PNEUMATIC LATCH

BACKGROUND OF THE INVENTION

This invention relates to emergency evacuation equipment for aircraft, in particular, to inflatable aircraft evacuation slides.

The requirement for reliably evacuating airline passengers in the event of an emergency is well known. Emergencies at take-off and landing often demand swift removal of passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. These inflatable slides are normally stored in an uninflated condition in a container or packboard requiring a minimum of space in the interior of the aircraft. Door exit inflatable slides are typically either mounted on the interior of the aircraft door or immediately adjacent thereto. Overwing exits are normally stored in an uninflated condition in a special compartment that opens to the exterior of the aircraft adjacent the overwing exit. The packboard compartment is closed by means of a cover panel that fits flush with and blends smoothly into the contours of the aircraft exterior. The cover panel is retained to the packboard compartment by means of a plurality of releasable latches. Opening of the aircraft emergency evacuation exit in the armed condition releases the releasable latches allowing the cover panel to fall away. Simultaneously, the emergency evacuation slide is inflated and extends to its deployed condition ready for evacuation of passengers.

The releasable latches that secure the cover panel must be sufficiently robust to hold the cover panel in place through numerous takeoff and landing cycles in all types of weather yet must function reliably to release the cover panel in spite of ice, snow, dust or other contaminants. Failure of a releasable latch to release when activated can cause damage to the inflatable slide and/or slide compartment and even delay deployment of the emergency evacuation slide. Accordingly, what is needed is a fail-safe releasable latch that releases the cover panel even in the event of a failure of the latch mechanism.

SUMMARY OF THE INVENTION

The present invention comprises an inflatable evacuation slide system that includes an inflatable evacuation slide stored in a packboard compartment the cover panel of which is retained by a plurality of frangible pneumatic latches. In an illustrative embodiment, the frangible pneumatic latches each comprise a tension member one end of which is attached to the packboard housing and the other end of which is releasably attached to the cover panel by a ramp-and-ball detent mechanism. In normal operation, a pneumatic signal operating on an actuator piston withdraws the ramp member of the ramp-and-ball detent mechanism to allow the latch mechanism to release the cover panel. In the event of a failure of the release mechanism, however, since the releasable latch secures the cover panel to the frangible tension member rather than to the packboard directly, the force of the inflating evacuation slide against the cover panel breaks the frangible member allowing the cover panel to drop away with only a brief delay in slide deployment.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
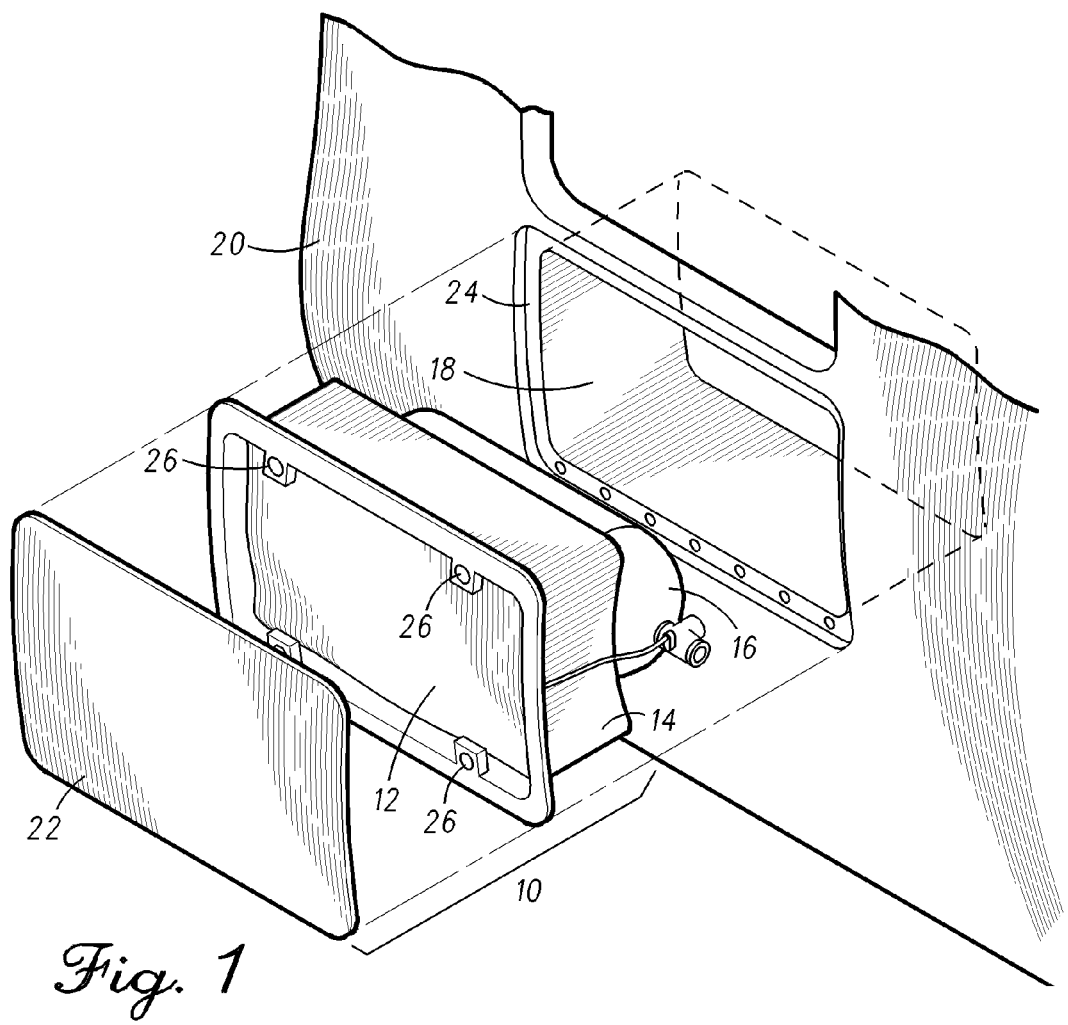
FIG. 1 is an exploded view of an inflatable aircraft evacuation slide incorporating features of the present invention.

The drawing figures are intended to illustrate the general manner of construction and are not necessarily to scale. In the detailed description and the drawing figures, specific illustrative examples are shown and herein described in detail. It should be understood, however, that the drawing figures and detailed description are not intended to limit the invention to the particular form disclosed but are merely illustrative and intended to teach one of ordinary skill how to make and/or use the invention claimed herein and for setting forth the best mode for carrying out the invention.

With reference to FIG. 1, an inflatable aircraft evacuation slide system 10 incorporating features of the present invention comprises an inflatable evacuation slide 12 stored in an uninflated condition within a packboard compartment 14 and a source of inflation gas 16 attached to the rear surface of the packboard compartment 14. Packboard compartment 14 itself is secured within a recess 18 in the outer hull of aircraft 20 and covered by a cover panel 22 that is seated in reveal 24 so that it is flush with and conforms to the general contour of the outer hull of aircraft 20. Cover panel 22 is secured to packboard compartment 14 by means of a plurality of frangible pneumatic latches 26 the operation of which is explained more fully hereinafter.

Figure 2:
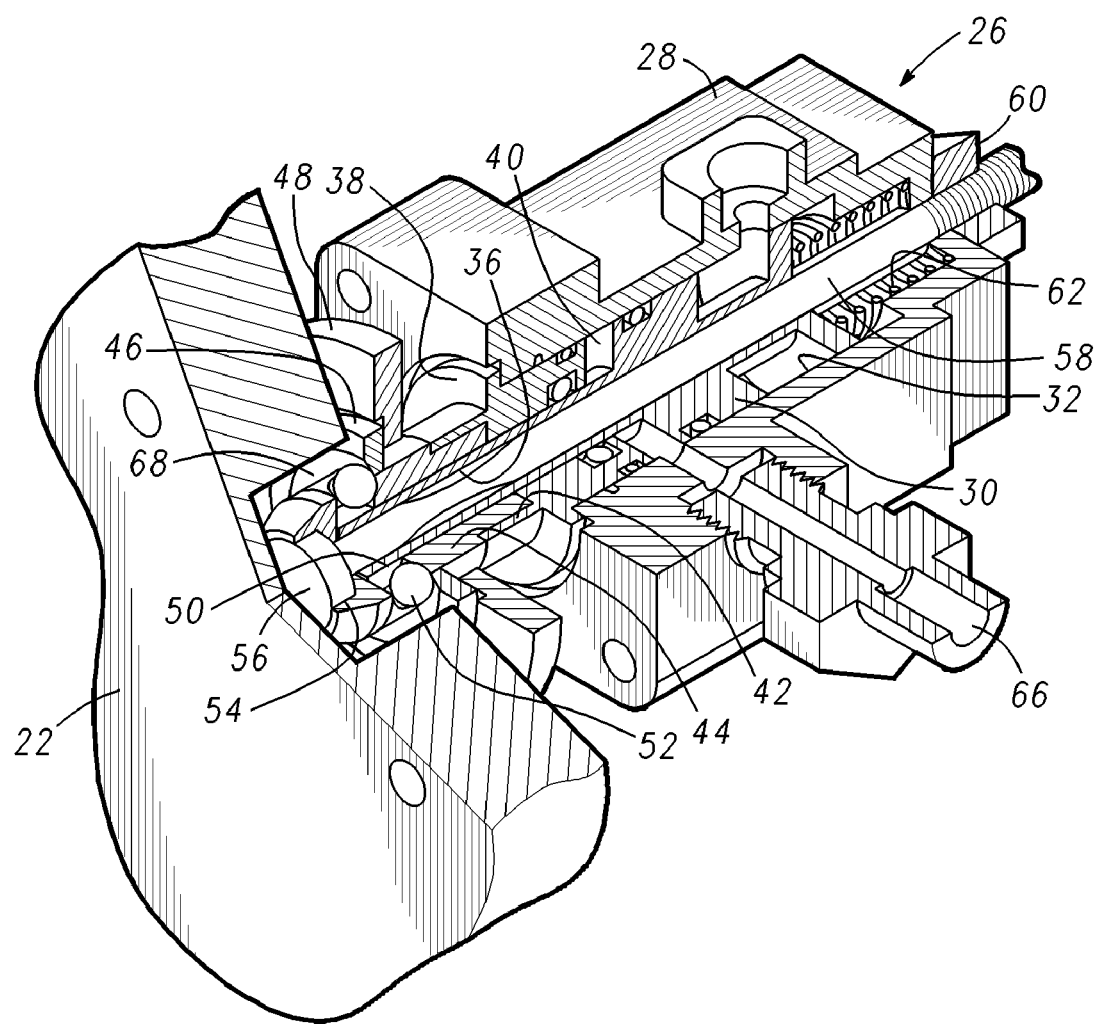
FIG. 2 is a perspective view, partially cut away, of a frangible pneumatic latch used in the evacuation slide system of FIG. 1 in its normally-latched position.

With reference additionally to FIG. 2, frangible pneumatic latch 26 comprises a housing 28 preferably made of aluminum containing a piston 30 preferably made of stainless steel that slides within a bore 32 formed in housing 28. Piston 30 comprises a piston body section 34 and an axial extension 36. The open end of bore 32 is sealed by a closure member 38 to form a substantially gas-tight chamber 40 within housing 28. Closure member 38 further includes a sleeve 42 that extends axially outward to slidingly engage a pilot member 44. Pilot member 44, in turn, is in sliding engagement with collar member 46 which is secured to cover panel 22 by a retainer 48.

Pilot member 44 includes a plurality of radial bores forming recesses 50 into which are disposed a plurality of ball bearing members 52 which form the movable detents of a ramp-and-ball detent latch mechanism. Pilot member 44 includes a counter bore 54 into which is received a flanged end 56 of a frangible tension member 58, the opposite end of which is secured to housing 28 by means of a conventional threaded fastener 60.

A spring 62 urges piston 30 toward cover panel 22, and in doing so forces axial extension 36 of piston 30 underneath ball bearing members 52 forcing them to extend outside of recesses 50. In this position, there is insufficient radial clearance between inner surface 64 of collar member 46 and ball bearing members 52 to permit pilot member 44 to be withdrawn through collar member 46. Thus, cover panel 22 is secured to packboard compartment 14 by means of the tensile force reacted from pilot member 44 through frangible tension member 58. Side loads on cover panel 22 are reacted through the sliding engagement of pilot member 44 which acts as a pin engaging sleeve 42 of closure member 38 which acts as a socket, thus creating a pin-and-socket joint, well known in the art as providing substantial resistance to lateral movement while providing little resistance to axial movement. Since lateral movement is resisted by the pin-and-socket joint created by pilot member 44 and sleeve 42, frangible tension member 58 is loaded in tension and not in shear or bending.

Figure 3:
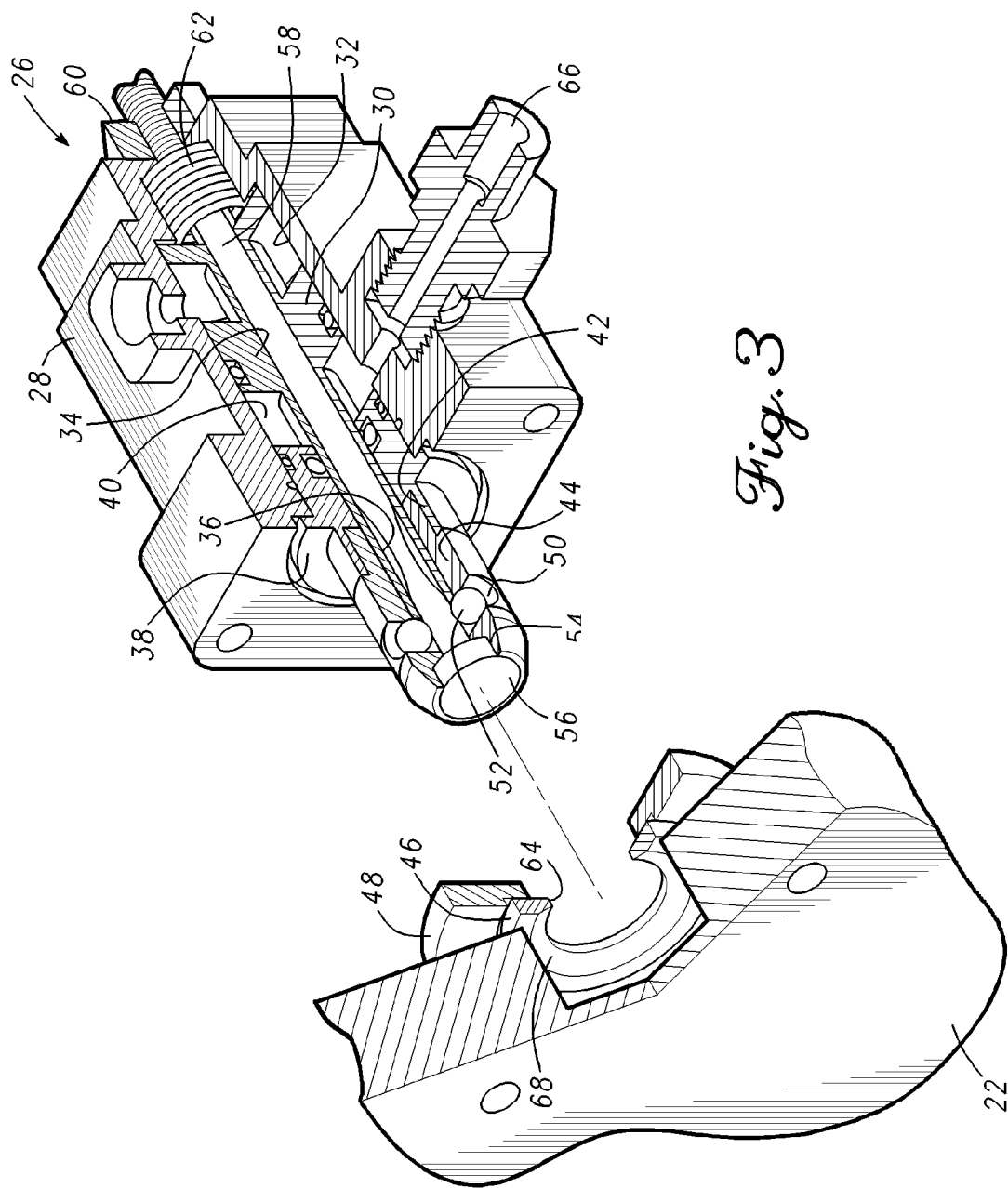
FIG. 3 is a perspective view, partially cut away, of the pneumatic latch of FIG. 2 of its normally open position.

With reference additionally to FIG. 3, in normal operation, when the aircraft emergency exit door is opened in the armed condition, a signal is sent to the inflator which begins inflation of the inflatable evacuation slide 12. Simultaneously, inflation gas enters inlet port 66 of housing 28 which pressurizes gas-tight chamber 40 causing piston 30 to move rearward overcoming the force of spring 62 and in doing so withdraws axial extension 36 from behind ball bearing members 52 in recesses 50. Once axial extension 36 is withdrawn, ball bearing members 52 are easily forced into recesses 50 by the sloped surface 68 of collar member 46. This allows collar member 46 to slide easily over the end of pilot member 44 thereby allowing cover panel 22 to fall away.

Figure 4:
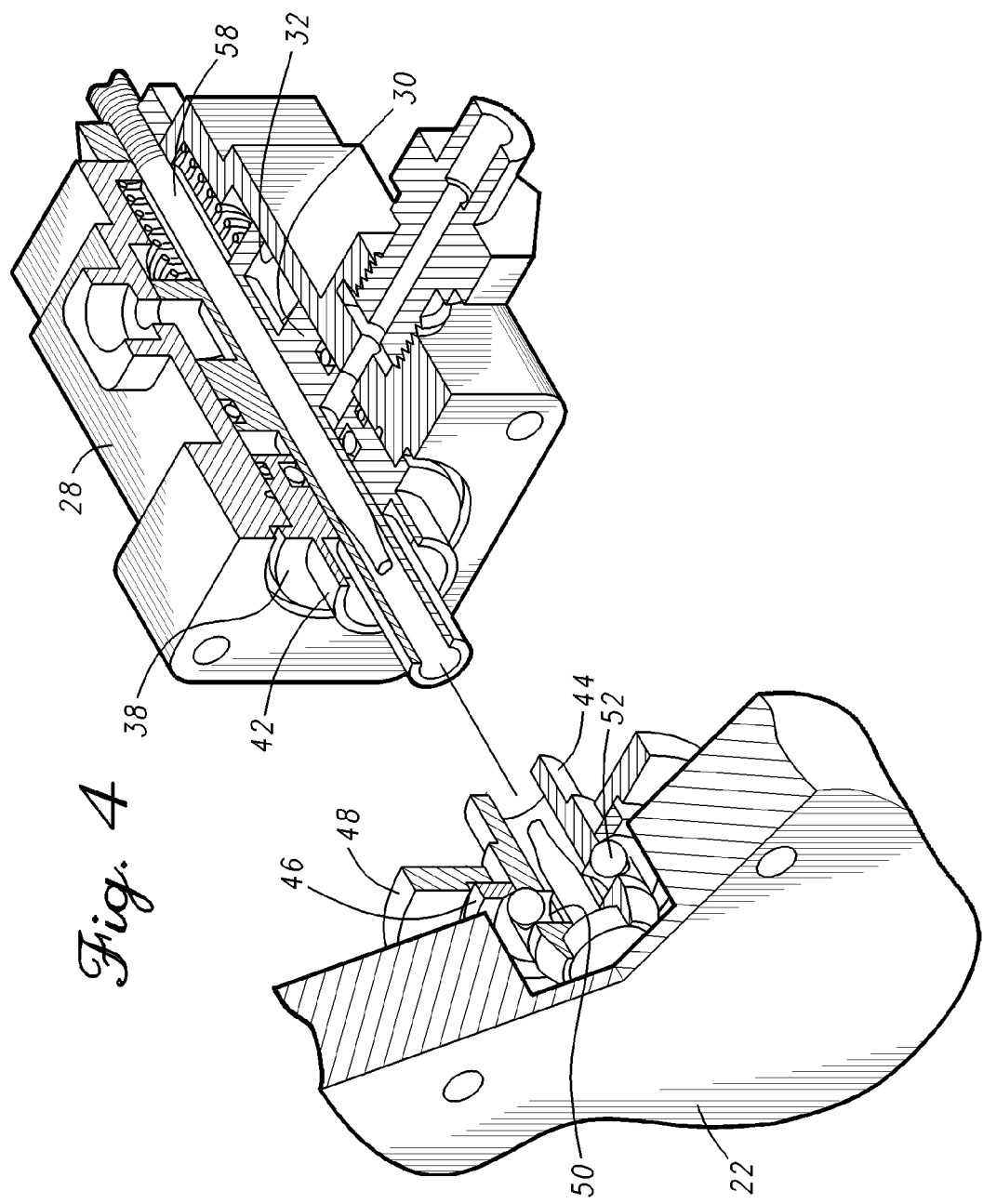
FIG. 4 is a perspective view, partially cut away, of the pneumatic latch of FIG. 2 in its fail-safe position.

With reference additionally to FIG. 4, in the event of a failure of the primary ramp-and-ball detent latch mechanism to release properly (e.g., dirt or ice causes piston 30 to seize in bore 32 or causes ball bearing members 52 to seize in recesses 50) pilot member 44 will be securely fastened to cover panel 22. Since collar member 46 is secured to housing 28 only through frangible tension member 58, however, pilot member 44 and with it cover panel 22 are released from packboard compartment 14 when the force of the inflating inflatable evacuation slide 12 exceeds the predetermined tensile load limit of frangible tension member 58, which in the illustrative embodiment is preferably 700+/−50 pounds or more preferably 745+/−25 pounds.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention should be limited only to extent required by the appended claims and the rules and principals of applicable law.

What is claimed is:

1. An inflatable aircraft evacuation slide system comprising:
    a packboard compartment having a cover panel;
    an inflatable evacuation slide stored in an undeployed condition within said packboard compartment, said inflatable evacuation slide being responsive to inflation pressure to expand and exert a force on said cover panel; and
    a pneumatic latch for retaining said cover panel, said pneumatic latch comprising:
    a housing attached to the packboard compartment, said housing containing a cylinder;
    a piston disposed in the cylinder, said piston being moveable from a first position to a second position;
    a frangible tension member having a first end, a second end, and a longitudinal axis, the first end of said frangible tension member being attached to said cover panel, the second end of said frangible tension member being attached to said housing, said frangible tension member having a predetermined tensile load limit above which said frangible tension member separates such that said first end of said frangible tension member is disconnected from said second end of said frangible tension member, said predetermined tensile load limit being less than the force exerted on said cover panel by the said inflatable evacuation slide during inflation of said slide;
    a pilot member slidingly engaging a bore in said cover panel along an axis parallel to the longitudinal axis of said frangible tension member, said pilot member preventing said frangible tension member from being subjected to shear forces between said cover member and said latch mechanism; and
    a latch mechanism comprising a latch member responsive to movement of said piston from said first position to said second position, said latch member moving to an engaged position in which said latch member couples said frangible tension member to the cover panel when said piston is in said first position, said latch member further moving to a disengaged position in which said latch member uncouples said frangible tension member from the cover panel when said piston is in said second position,
    whereby in a normal operational mode, said frangible tension member is released from said cover member to allow said cover member to open and whereby in a fail-safe mode, said frangible tension member fractures to release said cover member.

2. The evacuation slide system of claim 1, wherein:
    said piston further comprises an axial bore therethrough; and
    said frangible tension member comprises an elongate rod passing through said axial bore.

3. The evacuation slide system of claim 2, wherein:
    said elongate rod comprises a weakened portion having a predetermined tensile load limit.

4. The evacuation slide system of claim 1, wherein:
    said latch mechanism comprises a plurality of ball bearings forming a ramp-and-ball detent mechanism; and
    said piston further comprises an axial extension, the axial extension comprising a sleeve that forms a ramp of said ramp and ball detent mechanism, said sleeve extending out of said housing to engage said plurality of ball bearings to move said plurality of ball bearings into a latched position.

5. The evacuation slide system of claim 1, wherein the bore in said cover panel has an interior surface and wherein said latch mechanism comprises:
    a body operatively attached to the first end of said frangible tension member, said body having an outer surface and at least one recess for holding a ball bearing;
    said interior surface of said bore having a first portion conforming to the outer surface of said body and a second tapered portion tapering away from said outer surface of said body; and
    a ball bearing disposed in said recess, said ball bearing moveable from a first position extending out of said recess to engage said interior surface of said bore to a second position retracted within said recess.

6. The evacuation slide system of claim 1, wherein:
    said pilot member is concentric with the longitudinal axis of said frangible tension member.

\* \* \* \* \*

UNITED STATES PATENT AND TRADEMARK OFFICE
CERTIFICATE OF CORRECTION

PATENT NO. : 7,380,755 B2  
APPLICATION NO. : 11/138154  
DATED : June 3, 2008  
INVENTOR(S) : Gary L. Matsch Page 1 of 1

It is certified that error appears in the above-identified patent and that said Letters Patent is hereby corrected as shown below:

Column 2, line 63, "halt bearing" should be changed to --ball bearing--

Signed and Sealed this

Twenty-sixth Day of August, 2008

JON W. DUDAS  
*Director of the United States Patent and Trademark Office*